(12) United States Patent
Pridoehl et al.

(10) Patent No.: US 7,776,304 B2
(45) Date of Patent: Aug. 17, 2010

(54) NANOSCALE CRYSTALLINE SILICON POWDER

(75) Inventors: Markus Pridoehl, Grosskrotzenburg (DE); Paul Roth, Kempen (DE); Hartmut Wiggers, Reken (DE); Frank-Martin Petrat, Muenster (DE); Michael Kraemer, Schoeneck-Kilianstaedten (DE)

(73) Assignee: Evonik Degussa GmbH, Essen (DE)

( * ) Notice: Subject to any disclaimer, the term of this patent is extended or adjusted under 35 U.S.C. 154(b) by 379 days.

(21) Appl. No.: 10/579,460

(22) PCT Filed: Nov. 13, 2004

(86) PCT No.: PCT/EP2004/012890

§ 371 (c)(1),
(2), (4) Date: May 15, 2006

(87) PCT Pub. No.: WO2005/049492

PCT Pub. Date: Jun. 2, 2005

(65) Prior Publication Data

US 2007/0094757 A1    Apr. 26, 2007

(30) Foreign Application Priority Data

Nov. 19, 2003    (DE) ................. 103 53 995

(51) Int. Cl.
*C01B 33/027* (2006.01)
*C01B 33/02* (2006.01)
*C01B 33/021* (2006.01)

(52) U.S. Cl. .............. 423/350; 423/348; 423/349

(58) Field of Classification Search ......... 423/348–350; 556/472, 466; 977/775
See application file for complete search history.

(56) References Cited

U.S. PATENT DOCUMENTS

| | | | | |
|---|---|---|---|---|
| 3,012,861 A | * | 12/1961 | Ling | 423/349 |
| 3,900,660 A | * | 8/1975 | Bradley | 427/255.393 |
| 4,292,344 A | * | 9/1981 | McHale | 427/588 |
| 4,341,749 A | * | 7/1982 | Iya et al. | 423/349 |
| 4,826,668 A | * | 5/1989 | Breneman et al. | 423/349 |
| 4,994,107 A | * | 2/1991 | Flagan et al. | 75/367 |
| 6,007,869 A | | 12/1999 | Schreieder et al. | |
| 6,746,767 B2 | | 6/2004 | Gottfried et al. | |
| 6,761,747 B2 | | 7/2004 | Gottfried et al. | |
| 7,235,298 B2 | | 6/2007 | Katusic et al. | |
| 7,371,337 B2 | | 5/2008 | Katusic et al. | |
| 2004/0249037 A1 | | 12/2004 | Kolbe et al. | |
| 2006/0216441 A1 | | 9/2006 | Schubel et al. | |
| 2006/0281846 A1 | | 12/2006 | Hager et al. | |
| 2007/0149395 A1 | | 6/2007 | Kroell et al. | |
| 2007/0172415 A1 | | 7/2007 | Zimmermann et al. | |
| 2007/0173581 A1 | | 7/2007 | Hager et al. | |
| 2007/0183918 A1 | | 8/2007 | Monsheimer et al. | |
| 2007/0199477 A1 | | 8/2007 | Hill et al. | |
| 2008/0135799 A1 | | 6/2008 | Pridoehl et al. | |
| 2008/0161469 A1 | | 7/2008 | Hoss et al. | |

FOREIGN PATENT DOCUMENTS

| | | |
|---|---|---|
| EP | 0 214 489 | 3/1987 |
| EP | 0 372 918 | 6/1990 |
| EP | 0 494 753 | 7/1992 |
| EP | 0 776 053 | 5/1997 |

OTHER PUBLICATIONS

Dutta, et al. "Microstructural properties of silicon powder produced in a low pressure silane discharge" J. Appl. Phys. 77 (8) Apr. 15, 1995, pp. 3729-3733.*

Miller, et al. "Lithium doping og polycrystalline silicon" Appl. Phys. Letters 37(112) Dec. 15, 1980, pp. 1100-1101.*

Robert A. Marra, "Homogeneous Bucleation and Growth of Silicon Powder from Laser Heated Gas Phase Reactants" Department of Materials Science and Engineering, Massachussetts Institute of Technology May 12, 1983. [accessed from http://hdl.handle.net/1721.1/35323; relevant pages are provided in this mailing].*

U.S. Appl. No. 10/579,762, filed May 18, 2006, Pridoehl, et al.

U.S. Appl. No. 10/594,995, filed Sep. 29, 2006, Petrat, et al.

U.S. Appl. No. 11/908,458, filed Sep. 12, 2007, Petrat, et al.

H. Wiggins, et al., "Silicon Particle Formation by Pyrolysis of Silane in a Hot Wall Gasphase Reactor", Chem Eng. Technol. 24 (2001) 3, pp. 261-264.

Jorg Knipping, et al., "Synthesis of High Purity Silicon Nanoparticles in a Low Pressure Microwave Reactor", Journal of Nanoscience and Nanotechnology 2004, vol. 4, No. 8, pp. 1039-1044.

Yali Li, et al., "Preparation of Ultrafine Si Powders from $SiH_4$ by Laser-induced Gas Phase Reaction", J. Mater. Sci. Technol., vol. 11, 1995, pp. 71-74.

(Continued)

Primary Examiner—Timothy C Vanoy
Assistant Examiner—Diana J Liao
(74) Attorney, Agent, or Firm—Oblon, Spivak, McClelland, Maier & Neustadt, L.L.P.

(57) ABSTRACT

Aggregated crystalline silicon powder with a BET surface area of 20 to 150 m$^2$/g. It is prepared by subjecting at least one vaporous or gaseous silane and optionally at least one vaporous or gaseous doping material, an inert gas and hydrogen to heat in a hot wall reactor, cooling the reaction mixture or allowing the reaction mixture to cool and separating the product from gaseous substances in the form of a powder, wherein the proportion of silane is between 0.1 and 90 wt. %, with respect to the sum of silane, doping material, hydrogen and inert gases, and wherein the proportion of hydrogen, with respect to the sum of hydrogen, silane, inert gas and doping material, is in the range 1 mol. % to 96 mol. %. It can be used to produce electronic components.

7 Claims, No Drawings

OTHER PUBLICATIONS

U.S. Appl. No. 12/089,926, filed Jun. 4, 2008, Haeger, et al.
U.S. Appl. No. 09/044,797, filed Mar. 20, 1998, Brudny, et al.
U.S. Appl. No. 11/574,020, filed Feb. 21, 2007, Katusic, et al.
U.S. Appl. No. 11/720,613, filed Jun. 1, 2007, Pridoehl, et al.
U.S. Appl. No. 12/089,809, filed Apr. 10, 2008, Goering, et al.
U.S. Appl. No. 11/822,862, filed Jul. 10, 2007, Haeger, et al.
U.S. Appl. No. 12/279,276, filed Aug. 13, 2008, Roos, et al.
U.S. Appl. No. 60/943,997, filed Jun. 14, 2007, Katusic, et al.

* cited by examiner

NANOSCALE CRYSTALLINE SILICON POWDER

The invention provides a nanoscale crystalline silicon powder and the preparation and use thereof.

It is known that an aggregated nanoscale silicon powder can be prepared in a hot wall reactor (Roth et al., Chem. Eng. Technol. 24 (2001), 3). The disadvantage of this process has proven to be that the desired crystalline silicon is produced along with amorphous silicon which is formed by the reaction of silane at the hot reactor walls. In addition, the crystalline silicon has a low BET surface area of less than 20 m$^2$/g and thus is generally too coarse for electronic applications.

Furthermore, Roth et al. do not disclose a process in which doped silicon powders are obtained. Such doped silicon powders, with their semiconductor properties, are very important in the electronics industry. Furthermore, it is a disadvantage that silicon powder is deposited on the reactor walls and acts as a thermal insulator. This changes the temperature profile in the reactor and thus also changes the properties of the silicon powder.

The object of the invention is the provision of a silicon powder which avoids the disadvantages of the prior art. In particular, the silicon powder should be one with a uniform modification.

The invention is also intended to provide a process by which this powder can be prepared on an industrial scale in an economically viable manner.

The invention provides an aggregated crystalline silicon powder with a BET surface area of 20 to 150 m$^2$/g.

In a preferred embodiment, the silicon powder according to the invention may have a BET surface area of 40 to 120 m$^2$/g.

The expression aggregated is understood to mean that the spherical or largely spherical particles which are initially formed in the reaction coalesce to form aggregates during the course of further reaction. The extent of growth may be affected by the process parameters. These aggregates may form agglomerates during the course of further reaction. In contrast to aggregates, which generally cannot or can only partly be broken down into the primary particles, agglomerates form only a loose association of aggregates which can easily be broken down into the aggregates.

The expression crystalline is understood to mean that at least 90% of the powder is crystalline. This degree of crystallinity can be determined by comparing the intensities of the [111], [220] and [311] signals of the powder according to the invention with those of a silicon powder of known crystallinity and crystallite size.

In the context of the invention, a silicon powder with a degree of crystallinity of at least 95%, particularly preferably one with at least 98% crystallinity, is preferred. The evaluation of TEM images and the counting of primary particles which exhibit lattice lines, as a feature of the crystalline state, is suitable for determining this degree of crystallization.

Furthermore, the silicon powder according to the invention may be doped. The doping components may be phosphorus, arsenic, antimony, bismuth, boron, aluminum, gallium, indium, thallium, europium, erbium, cerium, praseodymium, neodymium, samarium, gadolinium, terbium, dysprosium, holmium, thulium, lutetium, lithium, ytterbium, germanium, iron, ruthenium, osmium, cobalt, rhodium, iridium, nickel, palladium, platinum, copper, silver, gold or zinc.

Particularly preferred, especially when used as a semiconductor in electronic components, the doping components may be the elements phosphorus, arsenic, antimony, bismuth, boron, aluminum, gallium, indium, thallium, europium, erbium, cerium, praseodymium, neodymium, samarium, gadolinium, terbium, dysprosium, holmium, thulium, ytterbium, lutetium. The proportion of these present in silicon powder according to the invention may be up to 1 wt. %. In general, a silicon powder is required in which the doping component is present in the ppm or even the ppb range. A range of 10$^{13}$ to 10$^{15}$ atoms of doping component per cm$^3$ is preferred.

Furthermore, it is possible for silicon powder according to the invention to contain lithium as a doping component. The proportion of lithium present in the silicon powder may be up to 53 wt. %. Silicon powder with up to 20 to 40 wt. % of lithium may be particularly preferred.

Similarly, silicon powder according to the invention may contain germanium as a doping component. The proportion of germanium present in the silicon powder may be up to 40 wt. %. Silicon powder with up to 10 to 30 wt. % of germanium may be particularly preferred.

Finally, the elements iron, ruthenium, osmium, cobalt, rhodium, iridium, nickel, palladium, platinum, copper, silver, gold, zinc may also be doping components in the silicon powder. The proportion of these present may be up to 5 wt. % of the silicon powder.

The doping components may be uniformly distributed in the powder or they may be enriched or intercalated in the shell or the core of the primary particles. The doping components may preferably be incorporated at silicon lattice sites. This depends substantially on the type of doping material and on reaction management.

A doping component in the context of the invention is understood to be the element present in the powder according to the invention. A doping material is understood to be the compound used in the process in order to obtain the doping component.

The silicon powder according to the invention may also have a hydrogen loading of up to 10 mol. %, wherein a range of 1 to 5 mol. % is particularly preferred. NMR spectroscopic methods such as, for example, $^1$H-MAS-NMR spectroscopy or IR spectroscopy are suitable for determining this.

The invention also provides a process for preparing the silicon powder according to the invention, characterized in that at least one vaporous or gaseous silane and optionally at least one vaporous or gaseous doping material, an inert gas and hydrogen are subjected to heat in a hot wall reactor, the reaction mixture is cooled down or allowed to cool down and the reaction product is separated from the gaseous substances in the form of a powder, wherein the proportion of silane is between 0.1 and 90 wt. %, with respect to the sum of silane, doping material, hydrogen and inert gases, and wherein the proportion of hydrogen, with respect to the sum of hydrogen, silane, inert gas and optionally doping material is in the range 1 mol. % to 96 mol. %.

Particularly advantageously, a wall-heated hot wall reactor may be used, wherein the hot wall reactor has a size such that as complete as possible conversion of the feedstock and optionally of doping material is achieved. In general the residence time in the hot wall reactor is between 0.1 s and 2 s. The maximum temperature in the hot wall reactor is preferably chosen in such a way that it does not exceed 1000° C.

Cooling the reaction mixture may be performed, for example, by external wall-cooling of the reactor or by the introduction of an inert gas in a quenching process.

A silane in the context of the invention may be a silicon-containing compound which provides silicon, hydrogen, nitrogen and/or halogens under the conditions of reaction. $SiH_4$, $Si_2H_6$, $ClSiH_3$, $Cl_2SiH_2$, $Cl_3SiH$ and/or $SiCl_4$ may preferably used, wherein $SiH_4$ is particularly preferred. In addition, it is also possible to use $N(SiH_3)_3$, $HN(SiH_3)_2$, $H_2N(SiH_3)$, $(H_3Si)_2NN(SiH_3)_2$, $(H_3Si)NHNH(SiH_3)$, $H_2NN(SiH_3)_2$.

Preferably, hydrogen-containing compounds of phosphorus, arsenic, antimony, bismuth, boron, aluminum, gallium, indium, thallium, europium, erbium, cerium, praseodymium, neodymium, samarium, gadolinium, terbium, dysprosium, holmium, thulium, ytterbium, lutetium, lithium, germanium, iron, ruthenium, osmium, cobalt, rhodium, iridium, nickel, palladium, platinum, copper, silver, gold, zinc can be used. Diborane and phosphane or substituted phosphanes such as $tBuPH_2$, $tBu_3P$, $tBuPh_2P$ and trismethylaminophosphane $((CH_3)_2N)_3P$ are particularly preferred. In the case of lithium as a doping component, it has proven most beneficial to use the metal lithium or lithium amide $LiNH_2$ as the doping material.

Mainly nitrogen, helium, neon or argon may be used as an inert gas, wherein argon is particularly preferred.

The invention also provides use of the powder according to the invention to produce electronic components, electronic circuits and electrically active fillers.

The silicon powder according to the invention is free of amorphous constituents and has a high BET surface area. The process according to the invention does not lead to the deposition of silicon on the reactor wall, as is described in the prior art. Furthermore, the process according to the invention enables the production of doped silicon powder.

EXAMPLES

Analytical techniques: The BET surface area is determined in accordance with DIN 66131. The degree of doping is determined using glow discharge mass spectrometry (GDMS). The hydrogen loading is determined using $^1$H-MAS-NMR spectroscopy.

Apparatus Used:

A tube with a length of 200 cm and a diameter of 6 cm is used as a hot wall reactor. It consists of quartz-glass or Si/SiC with a quartz glass liner. The tube is heated to 1000° C. externally using resistance heating over a length of 100 cm.

A $SiH_4$/argon mixture (mixture 1) of 1000 sccm of silane (standard centimeter cube per minute; 1 sccm=1 $cm^3$ of gas per minute with reference to 0° C. and atmospheric pressure) and 3000 sccm of argon and a mixture of argon and hydrogen (mixture 2), 5000 sccm of each, are supplied from above the hot wall reactor via a two-fluid nozzle. The pressure in the reactor is 1080 mbar. The powdered product is separated from gaseous substances in a downstream filter unit.

The powder obtained has a BET surface area of 20 $m^2$/g.

Examples 2 to 6 are performed in the same way as example 1, but the parameters are modified. The parameters are given in table 1.

TABLE 1

Process parameters and physico-chemical values of the silicon powders

| | | Example | | | | | |
|---|---|---|---|---|---|---|---|
| | | 1 | 2 | 3 | 4 | 5 | 6 |
| Mixture 1 | | | | | | | |
| $SiH_4$ | sccm | 1000 | 250 | 500 | 1000 | 250 | 2000 |
| Argon | sccm | 3000 | 3750 | 3500 | 2800 | 3150 | 1000 |
| $B_2H_6$ | sccm | — | — | — | 200 | — | — |
| $(tBu)_3P$ | sccm | — | — | — | — | 600 | — |
| Mixture 2 | | | | | | | |
| Hydrogen | sccm | 5000 | 25000 | 10000 | 5000 | 25000 | 0 |
| Argon | sccm | 5000 | 5000 | 5000 | 5000 | 5000 | 5000 |
| BET Si powder (approx.) | $m^2$/g | 20 | 140 | 50 | 20 | 140 | 7.5 |
| H loading | mol % | 1.3 | 3.5 | — | n.d. | n.d. | n.d. |
| Degree of doping | ppm | — | — | — | 2400 | 480 | — |

The invention claimed is:

1. A process for preparing an aggregated crystalline silicon powder comprising:

subjecting at least one vaporous or gaseous silane, an inert gas, hydrogen and optionally at least one vaporous or gaseous doping material, to heat in a hot wall reactor to form a reaction mixture comprising a product and gaseous substances, cooling the reaction mixture and separating the reaction product from the gaseous substances in the form of the aggregated crystalline silicon powder, wherein a proportion of the at least one silane is from 0.1 to 90 wt. %, with respect to the sum of the at least one silane, the optional at least one doping material, the hydrogen and the inert gases, a proportion of the hydrogen, with respect to the sum of the hydrogen, the at least one silane, the inert gas and the optional at least one doping material is in the range of from 1 mol. % to 96 mol. %, and the aggregated crystalline silicon powder has a BET surface area of 20 to 150 $m^2$/g.

2. The process according to claim 1, wherein the at least one silane is selected from the group consisting of $SiH_4$, $Si_2H_6$, $ClSiH_3$, $Cl_2SiH_2$, $Cl_3SiH$, $SiCl_4$, and mixtures thereof.

3. The process according to claim 1, wherein the at least one silane is selected from the group consisting of $N(SiH_3)_3$, $HN(SiH_3)_2$, $H_2N(SiH_3)$, $(H_3Si)_2NN(SiH_3)_2$, $(H_3Si)NHNH(SiH_3)$, $H_2NN(SiH_3)_2$, and mixtures thereof.

4. The process of claim 1, comprising the at least one doping material, wherein the at least one doping material is selected from the group consisting of hydrogen-containing compounds of phosphorus, arsenic, antimony, bismuth, boron, aluminium, gallium, indium, thallium, europium, erbium, cerium, praseodymium, neodymium, samarium, gadolinium, terbium, dysprosium, holmium, thulium, ytterbium, lutetium, lithium, germanium, iron, ruthenium, osmium, cobalt, rhodium, iridium, nickel, palladium, platinum, copper, silver, gold, zinc, and combinations thereof.

5. The process of claim 1, comprising the at least one doping material, wherein the at least one doping material is lithium metal or lithium amide ($LiNH_2$).

6. The process of claim 1 wherein the inert gas is selected from the group consisting of nitrogen, helium, neon, argon, and combinations thereof.

7. The process of claim 1, comprising at least one doping material.

* * * * *